United States Patent [19]

Ozaki et al.

[11] Patent Number: 4,679,463
[45] Date of Patent: Jul. 14, 1987

[54] LIMITED SLIP DIFFERENTIAL

[75] Inventors: Kiyotaka Ozaki, Yokosuka City; Shuuji Torii; Tomio Jindo, both of Yokohama City; Takashi Imaseki, Yokosuka City, all of Japan

[73] Assignee: Nissan Motor Co., Ltd., Yokohama City, Japan

[21] Appl. No.: 770,567

[22] Filed: Aug. 29, 1985

[30] Foreign Application Priority Data

Aug. 31, 1984 [JP] Japan .................. 59-181797
Oct. 23, 1984 [JP] Japan .................. 59-223487

[51] Int. Cl.⁴ .......................................... F16H 1/45.5
[52] U.S. Cl. ........................................ 74/711; 74/713; 74/710.5
[58] Field of Search ................. 74/711, 710.5, 710, 74/713

[56] References Cited

U.S. PATENT DOCUMENTS

| | | | |
|---|---|---|---|
| 3,264,900 | 8/1966 | Hartupee | 74/711 |
| 3,362,258 | 1/1968 | Thornton | 74/711 |
| 3,402,796 | 9/1968 | Mieras | 74/711 X |
| 3,724,289 | 4/1973 | Kennicutt | 74/711 |
| 3,837,236 | 9/1974 | Kagata | 74/711 |
| 3,906,812 | 9/1975 | Kagata | 74/711 |
| 4,012,968 | 3/1977 | Kelbel | 74/711 |
| 4,583,424 | 4/1986 | von Hiddessen et al. | 74/713 X |

FOREIGN PATENT DOCUMENTS

| | | | |
|---|---|---|---|
| 53-45832 | 4/1978 | Japan . | |
| 153142 | 11/1981 | Japan | 74/711 |
| 221046 | 12/1983 | Japan | 74/711 |
| 700355 | 11/1979 | U.S.S.R. | 74/711 |
| 797921 | 1/1981 | U.S.S.R. | 74/711 |
| 1110967 | 8/1984 | U.S.S.R. | 74/711 |
| 1120132 | 10/1984 | U.S.S.R. | 74/711 |

Primary Examiner—Rodney H. Bonck
Assistant Examiner—Dwight G. Diehl
Attorney, Agent, or Firm—Schwartz, Jeffery, Schwaab, Mack, Blumenthal & Evans

[57] ABSTRACT

A limited slip differential comprises a pair of friction clutches interposed between a pair of pressure rings and a differential casing. The friction clutches are urged toward an engaged condition to reduce a differential action when a pinion mate shaft having a pair of cam portions rotate to urge the pressure rings to move away from each other. The friction clutches are also urged toward the engaged condition to reduce the differential action when supplied with fluid pressure from a hydraulic system. The hydraulic system controls supply and discharge of fluid pressure to and from said friction clutches in view of running conditions of the vehicle, such as for example accelerated conditions.

5 Claims, 14 Drawing Figures 4,679,463

LIMITED SLIP DIFFERENTIAL

BACKGROUND OF THE INVENTION

1. Field of the Invention

The present invention relates to limited slip differentials suited for use in automotive drivelines.

2. Description of the Prior Art

Such a limited slip differential is known in the art that includes friction clutches which are urged to its engagement condition by the difference in torque on the differential gears and spring preload.

Another type also knwon in the art includes friction clutches which are operated by a hydraulic system, as is disclosed in the Japanese Provisional Patent Publication No. 53-45832.

A disadvantage of the former type is that the spring preload applied to the clutches is constant and cannot be set large enough to improve the directional stability of the associated vehicle at high speed since a large spring preload will inevitably disable the differential from effecting a desired differential action upon turning.

A disadvantage of the latter type is that since its engagement and disengagement depends upon hydraulic fluid pressure supplied thereto from the hydraulic system, mulfunction of the hydraulic system will inevitably disable the differential from effecting a slip limiting action. Furthermore, such a hydraulic system will be complicated when the differential is needed to effect various slip limiting actions depending upon various running conditions of the associated vehicle.

SUMMARY OF THE INVENTION

In accordance with the present invention, there is provided an improved and novel limited slip differential which comprises a casing adapted to be driven, a pair of side gears retained within the casing, a pinion gear retained within the casing and engaging the side gears to form a differential gear mechanism, a pinion mate shaft supporting thereon the pinion gear and having a cam portion, a pair of pressure rings retained within the casing and having depressions engaged with the cam portion, a pair of friction clutches interposed between the pressure rings and the casing, and means for selectively applying a preload to the friction clutches through control of fluid pressure.

The above structure is quite effective for overcoming the above noted disadvantages.

It is accordingly an object of the present invention to provide a novel and improved limited slip differential which can improve the directional stability of the associated vehicle at high speed without deteriorating a desired differential action upon turning.

It is another object of the present invention to provide a novel and improved limited slip differential which is compact in structure since upon engagement of friction clutches employed therein a resulting reaction force is transmitted, bypassing a differential casing, to a housing, whereby to allow a pair of roller bearings for supporting the differential casing on the housing to be of small-sized.

It is a further object of the present invention to provide a novel and improved limited slip differential of the above mentioned character which can improve a starting and accelerating characteristic of the associated vehicle without increasing a tendency of understeer upon high-speed running and without causing skidding and scuffing of tires upon turning.

It is a yet further object of the present invention to provide a novel and improved limited slip differential of the above mentioned character which can apply variable preloads on the friction clutches depending upon various running conditions of the vehicle, such as for example accelerated conditions.

BRIEF DESCRIPTION OF THE DRAWINGS

The features and advantages of the limited slip differential according to the present invention will become more clearly appreciated from the following description taken in conjunction with the accompanying drawings, in which like reference characters designate like or corresponding parts throughout the several views and wherein.

DETAILED DESCRIPTION OF THE PREFERRED EMBODIMENTS

Figure 1:
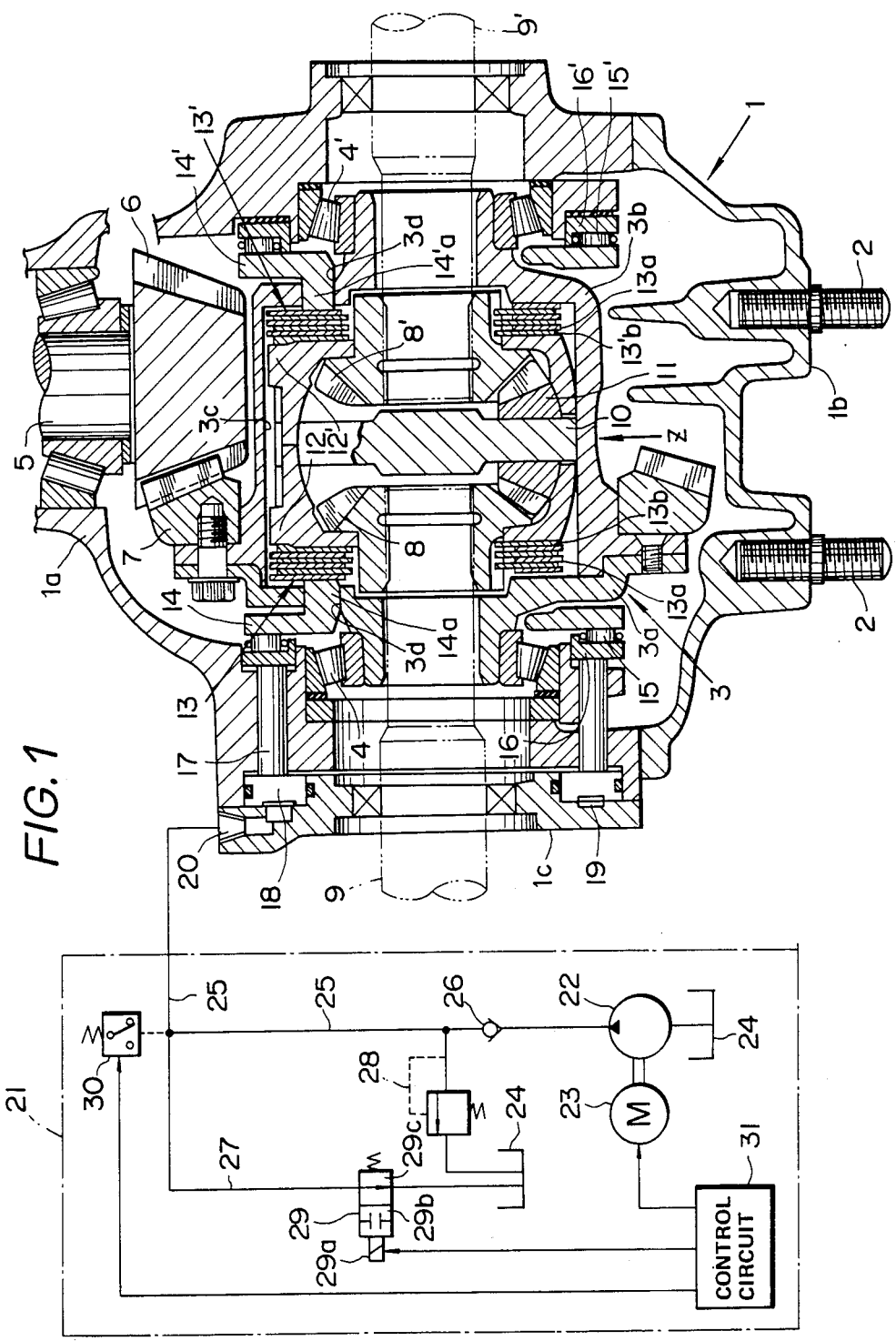
FIG. 1 is a schematic view of a limited slip differential according to an embodiment of the present invention.
Figure 2:
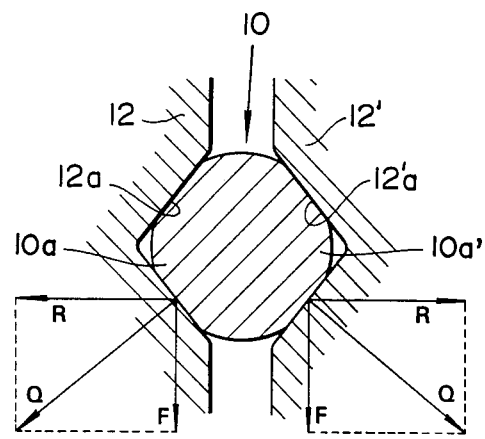
FIG. 2 is a view taken in the direction of the arrow "Z" of FIG. 1.
Figure 3:
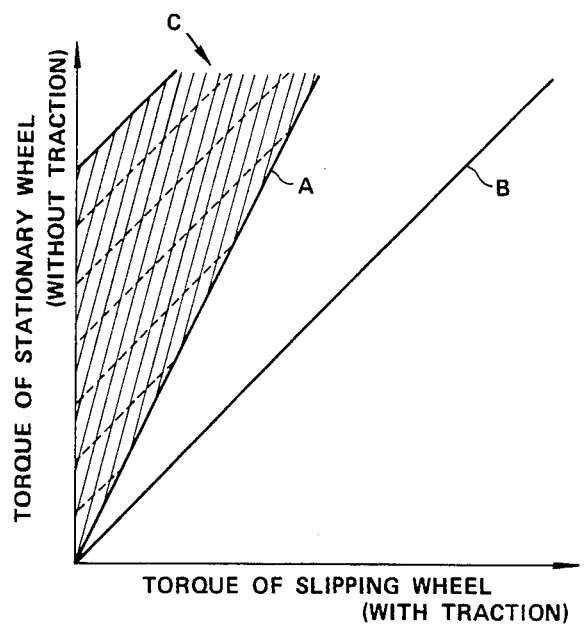
FIG. 3 is a graph showing a torque transmission characteristics of the limited slip differential of FIG. 1.

Referring first to FIGS. 1 to 3, a limited slip differential is of the type for use in an automotive vehicle and includes a housing 1 which is supported by a vehicle body (not shown) by way of stud bolts 2 and so on. The housing 1 consists of three housing sections, i.e., a front housing section 1a, rear housing section 1b and piston housing section 1c.

A differential casing 3 is disposed within the housing 1 and rotatably supported on same by means of a pair of taper roller bearings 4, 4'. The differential casing 3 consists of a left-hand differential casing section 3a and right-hand differential casing section 3b which are fastened together with screws (no numeral). A ring gear 7 is bolted to the differential casing 3 and meshes a pinion 6 of the pinion shaft 5 which is in turn drivingly coupled with a propeller shaft (not shown) so that the differential casing 3 rotates with the propeller shaft.

A pair of side gears 8, 8' are disposed within the differential casing 3 in such a manner as to be axially aligned with same. The side gears 8, 8' are respectively splined to a left-hand shaft 9 and right-hand shaft 9' which are in turn drivingly coupled with a left-hand wheel and right-hand wheel when viewed from the rear end of the vehicle. A pinion mate shaft 10 is mounted in the differential casing 3 in such a manner as to transverse the same. A pinion gear 11 is supported on the pinion mate shaft 10 to rotate therewith, and engages the side gears 8, 8' to form a standard differential gear mechanism.

A pair of pressure rings 12, 12' are disposed within the differential casing 3 for axial movement but against rotation relative to same. To this end, the differential casing 3 is formed at the inner periphery thereof with an axial groove 3c with which the pressure rings 12, 12' are engaged. The pressure rings 12, 12' are respectively formed with matching V-shaped grooves 12a, 12a' to receive therein correspondingly V-shaped cams 10a, 10a' at the opposite ends of the pinion mate shaft 10. A pair of friction clutches 13, 13' are interposed between the pressure rings 12, 12' and the differential casing 3. The friction clutches 13, 13' are of the multi-disc type and include friction plates 13a, 13a' mounted on the differential casing 3 against rotation and friction discs 13b, 13b' mounted on the side gears 8, 8' against rotation.

A pair of reaction plates 14, 14' are arranged to contact the outer ends of the friction clutches 13, 13'. To this end, the differential casing 3 is formed with a plurality of axial openings 3d communicating the inside and outside thereof, and the reaction plates 14, 14', having annular body portions 14b, 14b' disposed outside of the differential casing 3 and located near the axial ends of same, are formed with axial projections 14a, 14a' protruding through the openings 3d into the inside of the differential casing 3 and contacting the friction plates 13a, 13a'. The reaction plates 14, 14' therefore rotate together with the differential casing 3. A pair of thrust bearings 15, 15' are interposed between the reaction plates 14, 14' and annular spacers 16, 16'. One thrust bearing 15 is supported on the housing 1 by way of a plurality of push rods 17 slidably mounted in the housing 1 and an annular hydraulic piston 18, while the other thrust bearing 15' is supported on the housing 1 by way of the spacer 16' only. The hydraulic piston 18 is reciprocally mounted in the housing 1 and having an axial end held in contact with the piston rod 17 and the other end communicating with a hydraulic pressure chamber 19 and a hydraulic port 20.

The reference numeral 21 indicates a hydraulic circuit for controlling supply and discharge of hydraulic fluid under pressure to and from the hydraulic pressure chamber 19. The hydraulic circuit 21 consists of a hydraulic pump 22, an electric motor 23 for driving the hydraulic pump 22, a reservoir 24 from which the hydraulic pump 22 draws hydraulic fluid thereinto, a conduit 25 for conveying hydraulic fluid from the hydraulic pump 22 to the hydraulic port 20, a check valve 26 disposed in the conduit 25 for preventing flow of hydraulic fluid toward the hydraulic pump 22, a relief valve 28 disposed in the conduit 25 at a location upstream of the check valve 26 for releasing hydraulic fluid to the reservoir 24 when the fluid pressure in the conduit 25 is higher than a predetermined value, a conduit 27 branching off from the conduit 25 at a location between the relief valve 28 and the hydraulic port 20 to communicate the conduit 25 with the reservoir 24, a solenoid valve 29 disposed in the conduit 27 and assuming a first position 29b shutting off the conduit 27 when its solenoid 29a is energized and a second position 29c opening the conduit 27 to communicate the conduit 25 to the reservoir 24 when the solenoid 29a is de-energized, and a pressure switch 30 disposed in the conduit at a location between the relief valve 28 and the hydraulic port 20 for detecting the fluid pressure in the conduit 25. The pressure switch 30, solenoid valve 29 and electric motor 22 are electrically connected to a control circuit 31 to operate under control thereof.

When the motor 23 is put into operation in response to a control signal from the control circuit 31, the pump 22 is driven by the motor 23 and discharges hydraulic fluid under pressure which is supplied through the conduit 25 and the check valve 26 to the hydraulic port 20. The solenoid 29a is energized in response to a control signal from the hydraulic circuit 31, causing the solenoid valve 29 to assume the first position 29b shutting off the conduit 27 for thereby maintaining the fluid pressure in the conduit 25 relatively high. When the solenoid 29a is not supplied with the control signal from the control circuit 31, the solenoid 29 is caused to assume the second position 29c opening the conduit 27 and communicating the conduit 25 with the reservoir 24 for thereby allowing the fluid pressure in the conduit 25 to be lowered. The pressure sensor 30 detects the fluid pressure in the conduit 25 and produces a signal as an input to the control circuit 31 when the fluid pressure supplied to the hydraulic port 20 is lower than a predetermined value. In response to the signal from the pressure sensor 30, the control circuit 31 produces a control signal and sends it to the electric motor 23 to actuate same.

Though not shown in the drawing, the hydraulic circuit 21 is connected to an electric source by way of a main switch. When the main switch is turned on, the hydraulic circuit 21 and control circuit 31 are operates so as to maintain the fluid pressure in the conduit 25 at a predetermined value.

The limited slip differential thus far described according to an embodiment of the present invention operates as follows.

Upon ordinary running of the vehicle, the aforementioned main switch (not shown) is turned off. When this is the case, the hydraulic piston 18 remains inoperative. However, since the pressure rings 12, 12' and the friction clutches 13, 13' are operable, the slip limiting differential can produce an ordinary slip limiting action. More specifically, the pressure rings 12, 12' are movable away from each other when driven by the cams 10a, 10a' of the pinion mate shaft 10 to push the friction discs 13b, 13b' and the friction plates 13a, 13a' against the differential casing 3 and thereby engage the friction clutches 13, 13'. Upon engagement of the clutches 13, 13' a larger torque is transmitted to a wheel with traction (stationary wheel) as compared with a torque delivered to a wheel without traction (slipping wheel). This torque transmission characteristic is represented by the sloped line "A" in FIG. 3. The sloped line "B" represents a torque transmission characteristic of a differential without a slip limiting mechanism and shows that an equal torque is transmitted to the left and right wheels even when one wheel spins and the other wheel remains stationary.

The separating force R that causes the pressure rings 12, 12' to move away from each other is given by $R = Q \cos \theta$, where $\theta$ is the inclination of the cams 10a, 10a' or the grooves 12a, 12a' and Q is the drive force applied from the cams 10a, 10a' to the pressure rings 12, 12'. With this force R the friction clutches 13, 13' are brought into engagement, and the reaction force resulting from the transmitted to the housing 1 by way of the reaction engagement of the friction clutches 13, 13' are plates 14, 14' and thrust bearings 15, 15', bypassing the differential casing 3. The reaction force is thus sustained not by the differential casing 3 but by the housing 1, allowing the roller bearings 4, 4' to be of small-sized.

Accordingly, when there is a difference in rotation between the left and right wheels, a torque transmitted to a slower wheel is increased by the effect of the above described slip limited action, resulting in an increased tendency of understeer and at the same time improving the vehicle driving efficiency as compared with that of the differential without the slip limiting mechanism.

Upon high-speed straight-ahead running of the vehicle, the foregoing main switch (not shown) is turned on since the directional stability is required particularly under this driving condition of the vehicle. When the main switch of the hydraulic circuit 21 is turned on, hydraulic fluid under pressure is supplied through the hydraulic port 20 into the hydraulic chamber 19, causing the hydraulic piston 18 to move in the right-hand direction in the drawing.

The friction clutches 13, 13' are thus engaged with a force applied thereto from the hydraulic piston 18 in addition to the foregoing force R caused by the cam action of the pinion mate shaft 10, resulting in an increased slip limiting action and an improved vehicle directional stability since even when one of the wheels encounters a slippery patch or bounds to be put out of contact of the road, swerving of the associated vehicle is assuredly prevented.

Since the hydraulic piston 18 applies a preload to the friction clutches 13, 13' when the main switch of the hydraulic circuit 21 is turned on, various torque transmission characteristics may be obtained depending upon variations of the predetermined fluid pressure to be supplied to the hydraulic piston 18, and therefore the torque transmission characteristics effected by the limited slip differential according to this embodiment of the present invention may be described in the area "C" in the graph of FIG. 3.

The reaction resulting from the engagement of the friction clutches 13, 13' in the above manner under this running condition of the vehicle is sustained by the housing 1 by way of the reaction plate 14', thrust bearing 15' and the spacer 16'.

When one of the driving wheels of the vehicle encounters a slippery condition, i.e., drive in the mud, the main switch of the hydraulic circuit 21 and control circuit 31 is turned on similarly to the case of the high-speed straight-ahead running. When the main switch is turned on, a larger torque is transmitted to the slower wheel (wheel with traction) while a smaller torque is transmitted to the faster wheel (wheel get stuck in the mud), enabling the vehicle to drive out of the mud and making it easier to safely drive the vehicle on a slippery road.

The vehicle running conditions under which the main switch of the hydraulic circuit 21 is turned on are not limited to the foregoing conditions but may be selected otherwise when suitable in view of the running condition of the vehicle.

While the hydraulic piston 18 has been described and shown as a means for actuating the friction clutches 13, 13', this is not limitative but the clutch actuating means may be of the different form.

Figure 4:
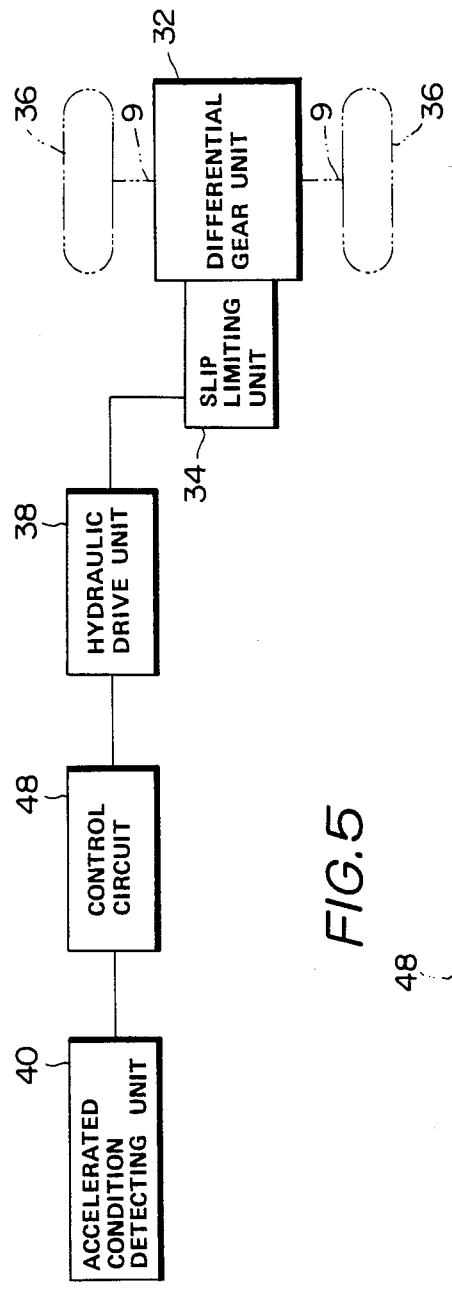
FIG. 4 is a block diagram schematically illustrating a limited slip differential according to another embodiment of the present invention.

Referring to FIGS. 4 to 6B, another embodiment of the present invention will be described. As schematically shown in FIG. 4, this embodiment comprises a differential gear unit 32 for effecting a differential action, a slip limiting unit 34 for reducing the differential action and thereby retarding the difference in rotation between left and right driving wheels 36 of the vehicle, an accelerated condition detecting unit 40 for detecting an accelerated condition of the vehicle and producing an analog signal representative thereof, a control circuit 48 for producing a control signal in dependence upon the analog signal from the accelerated condition detecting unit 40, and a hydraulic drive unit 38 for controlling the operation of the slip limiting unit 34 to increase and reduce the slip limiting action effected thereby in dependence upon the control signal from the control circuit 48.

The differential gear unit 32 and slip limiting unit 34 constitute a limited slip differential mechanism substantially similar to that of the previous embodiment, that is, the slip limiting unit 34 is constituted by the pressure rings 12, 12', friction clutches 13, 13', and cams 10a, 10a' and the differential gear unit 32 is constituted by the remaining parts except for the hydraulic circuit 21.

The hydraulic drive unit 38 is also constituted by the same constituent parts of the previous embodiment, i.e., by the hydraulic circuit 21 except for the control circuit 31, reaction plates 14, 14', thrust bearings 15, 15', spacers 16, 16', push rods 17, hydraulic chamber 18 and hydraulic port 20.

Figure 5:
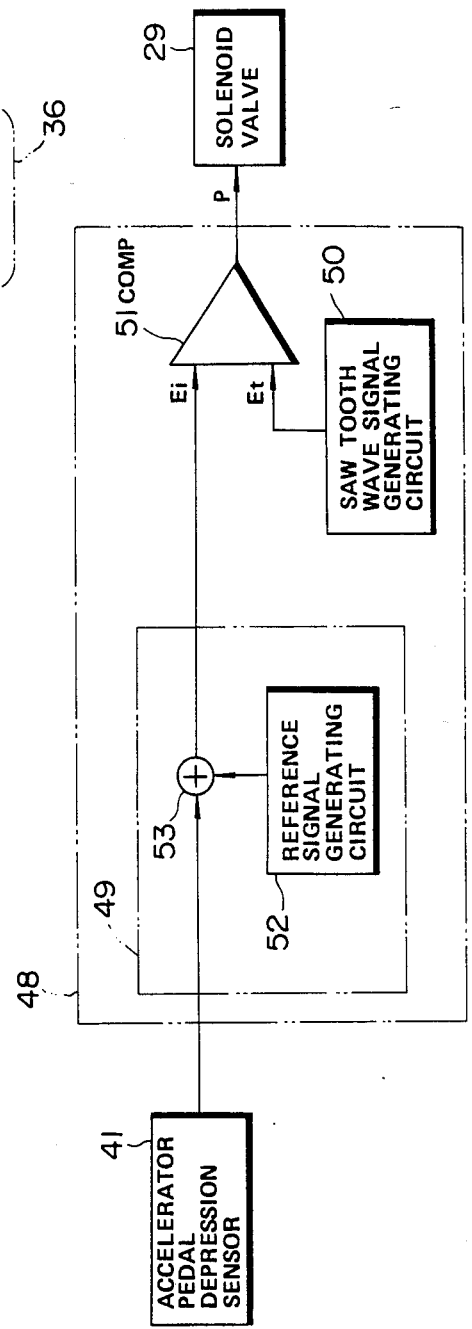
FIG. 5 is a block circuit diagram of an accelerated condition detecting unit and control circuit employed in the limited slip differential of FIG. 4.

The acceleration condition detecting unit 40 is adapted to detect an accelerator pedal depression and produce an accelerated condition signal representative thereof, e.g., may be constituted by an accelerator pedal depression sensor 41 including a potentiometer variable in resistance depending upon variations of accelerator pedal depression, as shown in FIG. 5. The accelerator pedal depression sensor 41 produces an analog signal (detection signal) representative of a detected accelerator pedal depression and supplies it to the control circuit 48.

The control circuit 48 is adapted to convert, by a pulse width modulation, the analog signal from the accelerator pedal depression sensor 40 to a pulse signal and control the hydraulic drive unit 38 depending upon the pulse signal, e.g., may be constituted by a microcomputer.

Figure 6A:
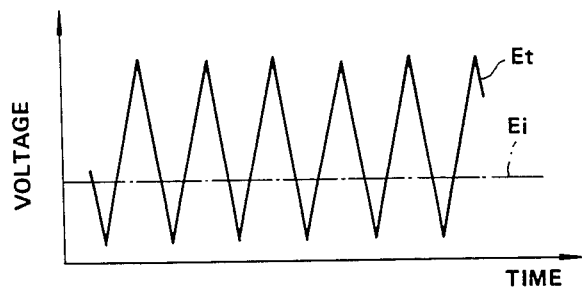
FIGS. 6A and 6B are graphs showing signals and pulses arising in the control circuit of FIG. 5.
Figure 6B:
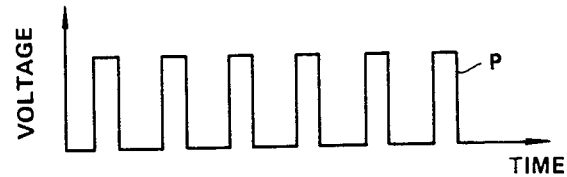

More specifically, as shown in FIG. 5, the control circuit 48 consists of a comparison signal generator 49 for producing a comparison signal Ei in dependence upon an analog signal (detection signal) from the accelerator pedal depression sensor 41, a saw tooth wave signal generating circuit 50 for producing a saw tooth wave signal Et, and a comparator 51 for comparing the comparison signal Ei with the saw tooth wave signal Et and producing a pulse signal (control signal) P as an input to the solenoid 29 of the hydraulic circuit 21. The above described comparison signal generator 49 consists of a reference signal generating circuit 52 for producing a reference signal of which voltage level is determined in view of a preload to be applied on the friction clutches 13, 13' and a summing operational unit 53 for summing up the reference signal and the analog signal from the accelerator pedal depression sensor 41 to produce a comparison signal Ei. When, for example, a comparison signal Ei and a saw tooth wave signal Et as shown in FIG. 6A are applied as the input to the comparator 51, the comparison signal Ei is converted by the saw tooth wave signal Et to such a pulse signal P as shown in FIG. 6B. The pulse signal P has a duty ratio variable depending upon variations of accelerator pedal depression since the analog signal (detection signal) varies depending upon variations of accelerator pedal depression. In response to this pulse signal P, the solenoid 29 of the hydraulic circuit 21 is energized to assume the first position 29b or de-energized to assume the second position 29c, whereby to control the operation of the hydraulic drive unit 38 in such a manner that the slip limiting unit 34 is supplied with a clutch engaging force or slip limiting force for reducing the differential action, which force is variable depending upon variations of accelerated condition of the vehicle. When the accelerator pedal is not depressed, a pulse signal is produced based upon a reference signal only, whereby to supply the slip limiting unit 34 with a preload for reducing the differential action.

The limited slip differential thus far described according to another embodiment of the present invention will operate as follows.

When the accelerator pedal is depressed to start or accelerate the vehicle, the accelerator pedal depression sensor 41 produces a detection signal variable depending upon variations of accelerator pedal depression as an input to the summing operational unit 53 of the control circuit 48. The summing operational unit 53 adds up the detection signal and the reference signal and produces a comparison signal Ei as the input to the comparator 51. In the comparator 51, the comparison signal Ei is converted by the saw tooth wave signal Et from the saw tooth wave signal generating circuit 50 to a pulse signal P, which pulse signal P is applied as the input to the solenoid 29 to control opening and closing of the conduit 25 interconnecting the hydraulic port 20 and the reservoir 24. By the operation of the solenoid valve 29, the fluid pressure in the hydraulic port 20 of the hydraulic drive unit 38 is controlled to be variable depending upon variations of accelerator pedal depression. By the fluid pressure in the hydraulic port 20 the hydraulic piston 18 of the hydraulic drive unit 38 is actuated to apply a clutch engaging force to the friction clutches 13, 13' by way of the push rods 17, spacers 16, 16', thrust bearings 15, 15' and reaction plates 14, 14a'. When the accelerator pedal is not depressed, a pulse signal is produced based upon a reference signal only, whereby to adjust the clutch engaging force to a predetermined preload on the friction clutches 13, 13'.

In the above manner, a clutch engaging force variable depending upon variations of accelerator pedal depression is applied to the firction clutches 13, 13', whereby to variably determine the slip limiting action depending upon variations of vehicle acceleration and make it possible to transfer the left and right driving wheels 34 a larger torque than that by the comparable prior art limited slip differential. That is, the transfer ratio of the differential is increased, and the starting and acceleration characteristic of the vehicle is improved. Further, since the accelerator pedal depression is small upon ordinary turning of the vehicle, the slip limiting action is reduced to allow the differential gear unit 32 to provide a desired differential action and the differential is prevented from effecting an increased tendency of understeer upon high speed running as well as skidding and scuffing upon low speed turning. Further, since the differential action is variable depending upon variations of accelerator pedal depression, it becomes possible to drive the vehicle out of sticky situtations or to enjoy a so-called power slide driving technique depending upon a driver's operation of the accelerator pedal.

Figure 7:
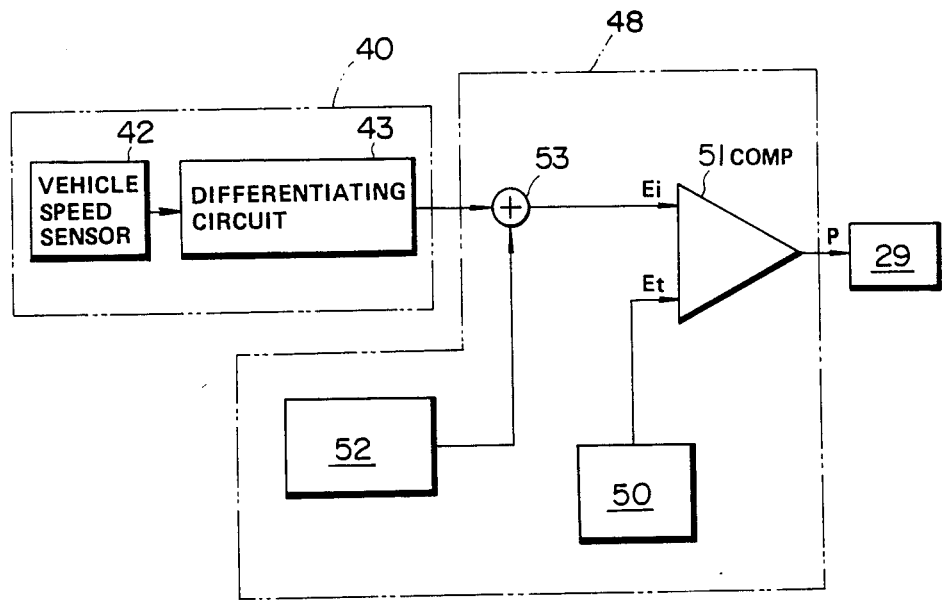
FIGS. 7 and 8 are block circuit diagrams of variants of the accelerated condition detecting unit and control circuit to be employed in the limited slip differential of FIG. 4.

FIG. 7 shows a variant of the accelerated condition detecting unit 40 and control circuit 48. As illustrated, the accelerated condition detecting unit 40 is constituted by a vehicle speed sensor 42 and a differentiating circuit 43. The vehicle speed sensor 42 is formed from, for example, a coil for detecting variations of the magnetic flux around a magnet which is rotatable with a speed meter cable and adapted to detect a vehicle speed analogously and produce an analogous detection signal representative thereof. The differentiating circuit 43 is constituted by a differential amplifier, etc. and differentiates the detection signal from the vehicle speed sensor 42 to produce an accelerated condition signal. The accelerated condition signal from the differentiating circuit 43 is supplied to the summing operational unit 53 and added thereat to the reference signal from the reference signal generating circuit 52 to create a comparison signal Ei applied as an input to the comparator 51.

With this variant, the slip limiting unit 34 is supplied with a clutch engaging force variable depending upon variations of vehicle acceleration, thus making it possible to transfer a larger torque to the left and right driving wheels 34 as compared with that by the comparable prior art differential. This embodiment therefore can produce substantially the same effect as the previous embodiment.

Figure 8:
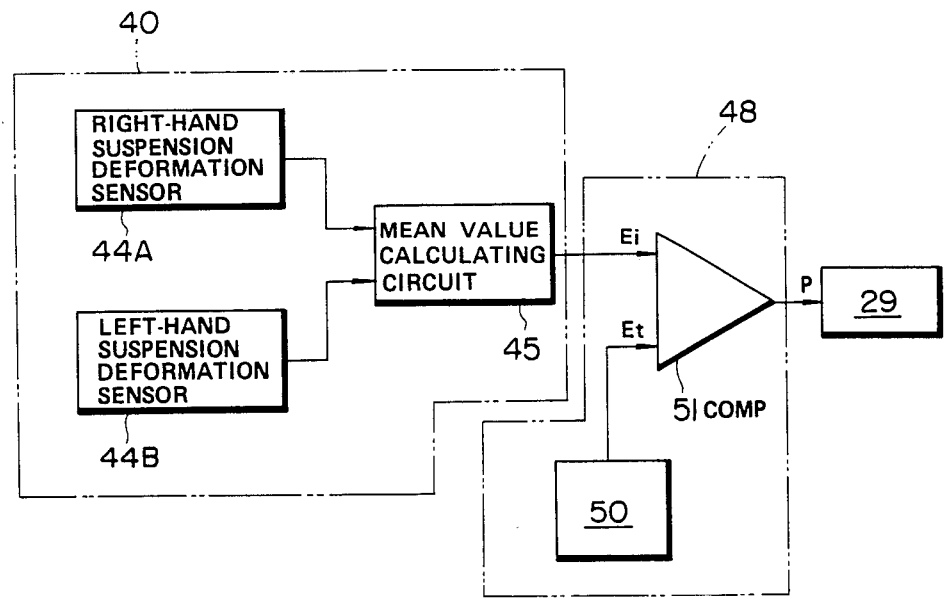

FIG. 8 shows another variant of the accelerated condition detecting unit 40 and control unit 48. The accelerated condition detecting unit 40 includes a suspension deformation sensor for detecting expansion and contraction of susension coil springs associated with the left and right driving wheels 36 since the suspension coil springs are caused to expand and contract by the gravity applied thereto upon acceleration and deceleration of the vehicle and produces a detection signal for use as an accelerated condition signal.

More specifically, in the case of a front engine-rear wheel drive vehicle, the accelerated condition detecting unit 40 is constituted by a left-hand suspension deformation sensor 44A and right-hand suspension deformation sensor 44B respectively mounted on suspensions associated with the left and right rear driving wheels 36 (see FIG. 4) to detect expansion and contraction of suspension coil springs thereof and produce deformation signals representative thereof, and a mean value calculating circuit 45 for calculating a mean value of the detected deformation signals from the sensors 44A and 44B and producing a comparison signals Ei as an input to the comparator 51. The above described suspension deformation sensors 44A and 44B may, for example, be constituted by a magnet, a magnetic reluctance element responsive to variations of the magnetic flux around the magnet to vary the magnetic reluctance thereof, etc. and adapted to produce a deformation signal of which voltage level increases as the associated suspension coil springs contact increasingly since the suspension coil springs for the rear driving wheels 36 contract upon acceleration of the vehicle while producing a deformation signal of which voltage level decreases as the associated coil springs expand increasingly since the suspension coil springs expand upon deceleration.

Figure 9:
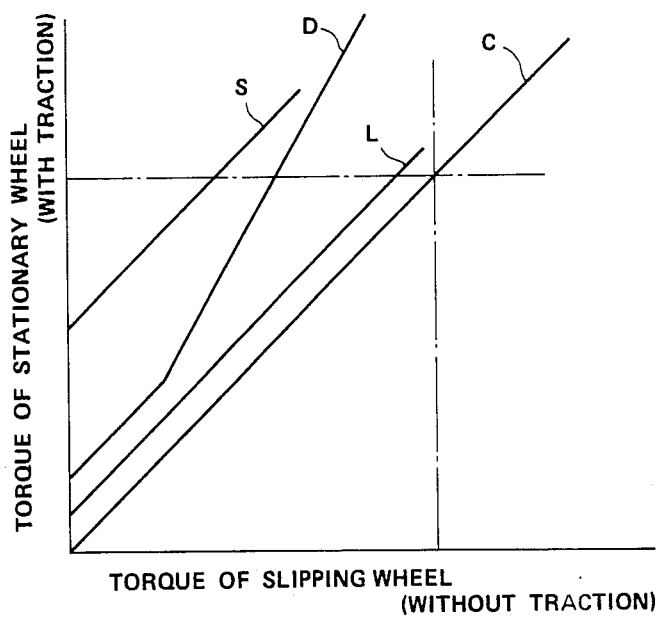
FIG. 9 is a graph showing a torque transmission characteristic of the limited slip differential with the variant of FIG. 8.

Accordingly, upon acceleration of the vehicle, a deformation signal of which voltage level increases as the associated suspension coil springs contact increasingly, is supplied from the left-hand and right-hand suspension deformation sensors 44A, 44B to the mean value calculating circuit 45 which in turn calculating a mean value of the detected deformation signals and produces a comparison signal Ei as an input to the comparator 51. By this, upon acceleration of the vehicle, a slip limiting force variable depending upon variations of expansion and contraction of the suspension coil springs, is applied to the slip limiting unit 34, whereby to make it possible to attain an increased transfer ratio. For example, with this variant, such a torque transmission characteristic as represented by the line "S" in FIG. 9 is obtained which is improved considerably as will be understood when compared with the corresponding characteristic of the comparable prior art differential represented by the line "D" in the same figure.

Conversely, upon deceleration of the vehicle, since the suspension coil springs associated with the left and right rear driving wheels 34 are caused to expand, the suspension deformation sensors 44A, 44B produce deformation signals of which voltage levels reduce in inverse proportion to increase in expansion of the suspension coil springs, and based upon a mean value of the deformation signals a clutch engaging force is applied to the slip limiting unit 34, thus largely allowing the differential gear unit 32 to provide a differential action. That is, the torque transmission characteristic effected by the differential of this invention upon deceleration of the vehicle is represented by the line "L" in FIG. 9 and therefore quite close to the torque transmission characteristic "C" of the comparable prior art differential.

As a result, the transfer ratio can be increased upon deceleration to attain an improved directional stability of the vehicle upon high speed running, while at the same time acceleration upon turning can be improved. Further, upon deceleration, since the transfer ratio can be largely reduced, skidding and scuffing of tires upon turning can be prevented. Yet furthermore, since expansion and contraction of the suspension coil springs is used to create an acceleration condition signal, such a transfer ratio is obtained that varies depending upon variations of the force of tire-to-road friction, which force varies depending upon variations of load on the tires.

Figure 10:
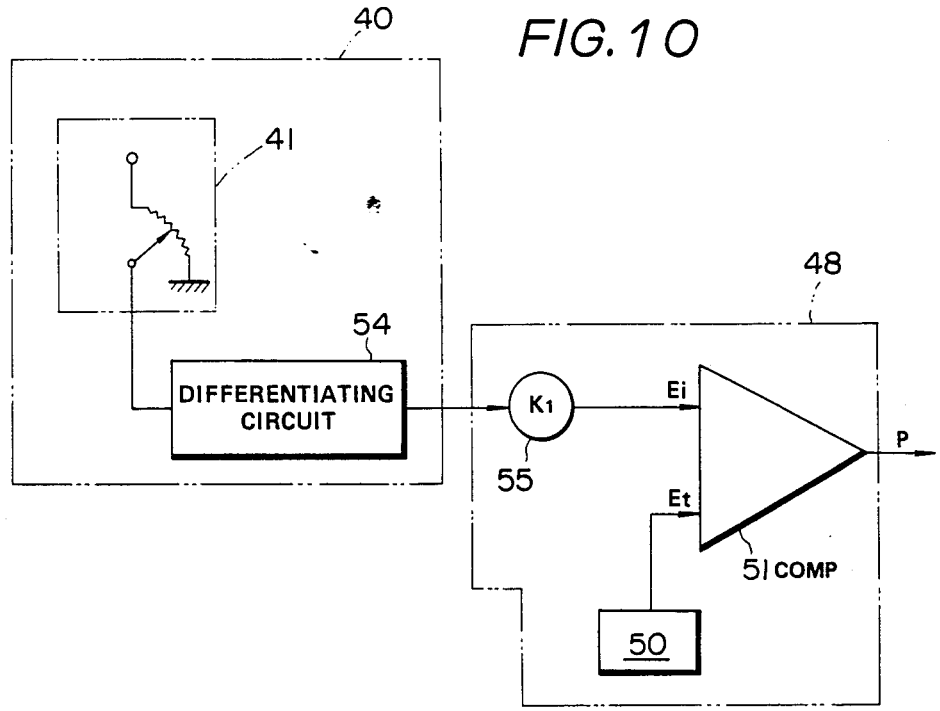
FIGS. 10 to 12 are block circuit diagrams of further variants of the accelerated condition detecting unit and control circuit to be employed in the limited slip differential of FIG. 4.

FIG. 10 shows a further variant of the accelerated condition detecting unit 40 and the control circuit 48.

Generally, upon application of a clutch engaging force to the slip limiting unit 34, there is a difference between the time when the hydraulic drive unit 38 receives a control signal from the control circuit 48 and the time when the hydraulic drive unit 38 actually applies a clutch engaging force to the slip limiting unit 34, resulting in a delayed torque transmission. With a view to solving this problem, this variant includes an accelerator pedal depression sensor for sensing depression of an accelerator pedal and a differentiating circuit for calculating the derivative of the detection signal form the accelerator pedal, whereby to control the hydraulic drive unit based upon the derivative.

More specifically, as shown in FIG. 10, the accelerated condition detecting unit 40 consists of an accelerator pedal depression sensor 41 and a differentiating circuit 54 for calculating the derivative of the detection signal from the accelerator pedal depression sensor 41 and producing an output signal representative thereof as an input to a gain control 55 of the control circuit 48. The output signal from the differentiating circuit 54 is adjusted by the gain control 55 to be of a suitable voltage level, whereby to obtain a comparison signal Ei. In the meantime, the differentiating circuit 54 is constituted by an operational amplifier, etc.

Figure 11:
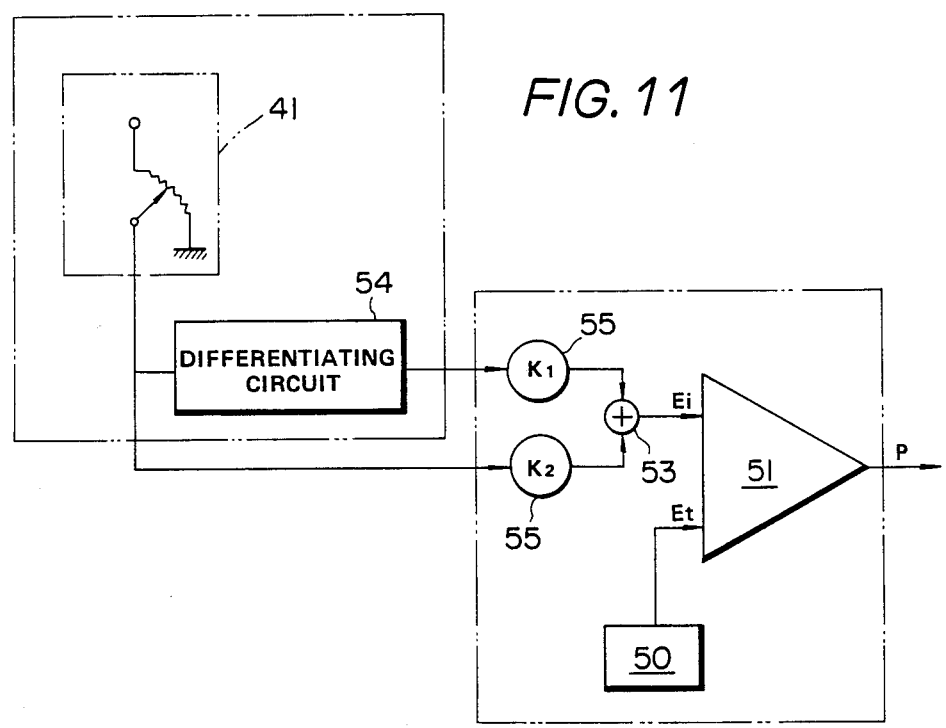

With this variant, since the comparison signal Ei is determined by the derivative of an acceleration pedal depression, the speed of conversion of the pulse signal is increased, making it possible to reduce the responsive delay of the hydraulic drive unit 38 and therefore the delay of torque transmission to the left and right driving wheels 36. As a result, the response to a driver's acceleration work is improved and therefore a vehicle acceleration performance is improved. In the meantime, as shown in FIG. 11, the detection signal from the accelerator pedal depression sensor 41 may be added to its derivative and used as a comparison signal Ei to produce the same effect as the variant of FIG. 11.

Figure 12:
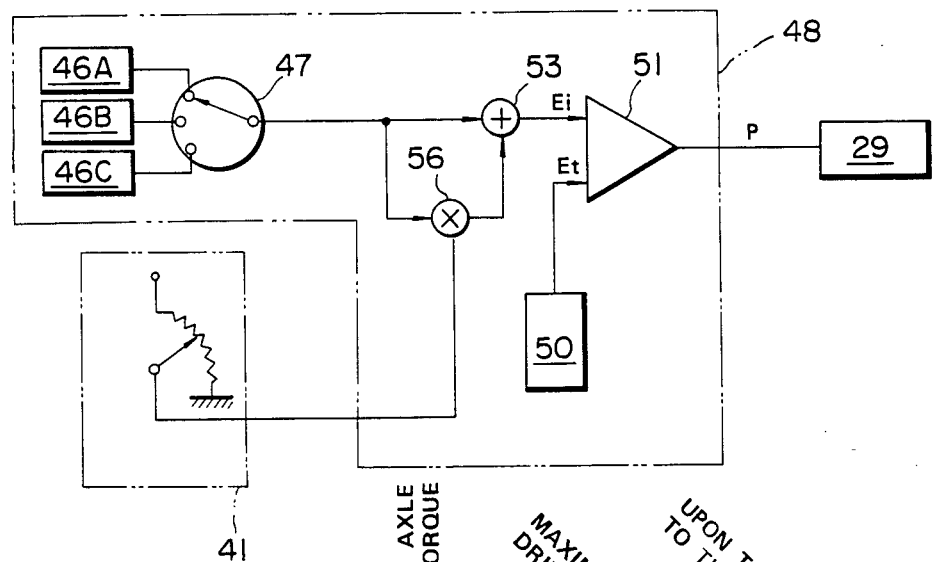

FIG. 12 shows a still further variant of the accelerated condition detecting unit 40 and the control circuit 48. With this variant, the reference signal for applying a preload to the slip limiting unit 34 is of the voltage level variable stepwisely or steplessly, whereby to make it possible to selectively change a transfer ratio in accordance with the road surface condition and the driver's taste.

For example, the accelerated condition detecting unit 40 is constituted by an accelerator pedal depression sensor 41, and a differential action control unit is provided for stepwisely changing the voltage level of the reference signal for determining the minimum slip limiting force (preload). This differential action control unit consists of reference signal generating circuits 46A, 46B, 46C for producing reference signals of different voltage levels, and a selection switch 47 for selectively connecting one of the reference signal generating circuits 46A, 46B, 46C to the summing operational unit 53. The control circuit 48 is provided with a multiplier 56 for multiplying the reference signal from selected one of the reference signal generating circuits 46A, 46B, 46C by the detection signal from the accelerated pedal depression sensor 41 and producing a signal as an input to the summing operational unit 53. The above described selection switch 47 is preferably disposed adjacent the driver's seat for ease of access thereto.

Accordingly, the pulse signal produced by the comparator 51 and applied to the solenoid valve 29 of the hydraulic circuit 21 can be selectively varied in voltage level by operating the switch to select desired one of the reference signals, whereby to make it possible to variably adjust a preload applied to the slip limiting unit 34 to one of three different values.

Figure 13:
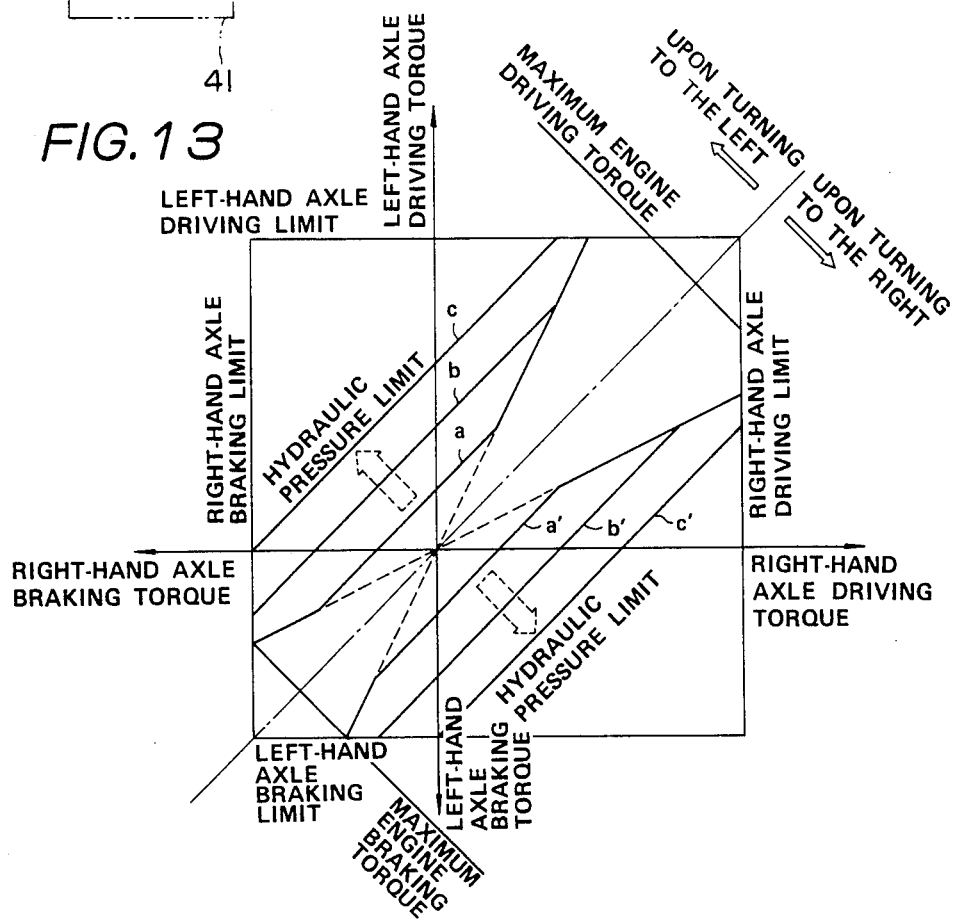
FIG. 13 is a graph showing a torque transmission characteristic of the limited slip differential with the variant of FIG. 12.

With this variant, by the operation of the switch 47, such torque transmission characteristics as shown in FIG. 13 are obtained, that is, by changing the position of the switch 47, a preload on the friction clutches 13, 13' can be changed in three ways as represented by the three pairs of lines "a" and "a'", "b" and "b'", "c" and "c'". As a result, by the driver's switching operation, a transfer ratio can be selectively varied in accordance with the road surface condition or the driver's taste. For example, when a clutch engaging force resulting from a preload is increased upon running on a rough road by operating the switch 47, a differential action is reduced, making it possible to transmit a larger torque to the left and right driving wheels 36. Conversely, when the switch 47 is operated so as to reduce the clutch engaging force resulting from the preload upon running on a dry paved road, the differential action is increased, making it possible to prevent skidding and scuffing of tires upon turning. In the meantime, the number of the necessary reference signal generating circuits is not necessitated to be equal to the number of the stages of the switch 47 but may be one if a reference signal generating circuit is of the kind operable to produce a signal of variable voltage. Further, the voltage of the reference signal from the reference signal generating circuit may be varied steplessly by using a volume control or the like, whereby to make it possible to adjust the preload steplessly.

What is claimed is:

1. A limited slip differential for a vehicle comprising:
   a casing adapted to be driven;
   a pair of side gears retained within said casing;
   a pinion gear retained within said casing and engaging said side gears to form a differential gear mechanism;
   a pinion mate shaft supporting thereon said pinion gear and having a cam portion;
   a pair of pressure rings retained within said casing having grooves engaged with said cam portion;
   a pair of friction clutches interposed between said pressure rings and said casing; and
   means for selectively applying a preload to said friction clutches through control of fluid pressure;
   a housing within which said casing is retained;
   a pair of roller bearings rotatably supporting said casing on said housing; and
   a pair of reaction plates having annular body portions mounted on said casing for movement axially of said casing but against rotation relative to same and each having a portion disposed outside of said casing and a portion projecting inside of same to engage corresponding one of said friction clutches, one of said reaction plates being rotatably supported on said housing and the other being operatively connected to said means to receive a fluid pressure therefrom.

2. A limited slip differential as set forth in claim 1, further comprising a pair of thrust bearings one of which is interposed between said one reaction plate and said housing and the other is interposed between said other reaction plate and said means.

3. A limited slip differential as set forth in claim 1, in which said means comprises an annular hydraulic piston slidably mounted in said housing, a plurality of push rods slidably mounted in said housing and engaging at an end said hydraulic piston and at the other end said other thrust bearing, a pair of spacers one of which is interposed between said one thrust bearing and said housing and the other is interposed between said other end of said push rods and said other thrust bearing, a hydraulic chamber to which an end of said hydraulic piston is exposed, a hydraulic port communicated with said hydraulic chamber, and a hydraulic system fluidly connected to said hydraulic port for controlling supply and discharge of hydraulic fluid under pressure to and from said hydraulic chamber.

4. A limited slip differential as set forth in claim 3, in which said hydraulic system comprises a hydraulic pump, an electric motor for driving said hydraulic pump, a reservoir from which said hydraulic pump draws hydraulic fluid thereinto, a first conduit for conveying hydraulic fluid from said hydraulic pump to said hydraulic port, a check valve disposed in said first conduit for preventing flow of hydraulic fluid toward said hydraulic pump, a relief valve disposed in said first conduit at a location upstream of said check valve for releasing hydraulic fluid to said reservoir when the fluid pressure in said first conduit is higher than a predetermined value, a second conduit branching off from said first conduit at a location between said relief valve and said hydraulic port to communicate said first conduit with said reservoir, a solenoid valve disposed in said second conduit and assuming a first position shutting off said second conduit when energized and a second position opening said second conduit to communicate said first conduit to said reservoir when de-energized, a pressure switch disposed in said first conduit at a location between said relief valve and said hydraulic port for detecting the fluid pressure in said first conduit, and a control circuit to which said pressure switch, solenoid valve and electric motor are electrically connected to operate under control thereof in such a manner that a predetermined fluid pressure is supplied to said hydraulic port when to apply a preload to said friction clutches.

5. A limited slip differential for a vehicle comprising:
   a casing adapted to be driven about an axis of rotation thereof;
   a pair of side gears retained within said casing;
   a pinion gear retained within said casing and engaging said side gears to form a differential gear mechanism;
   a pinion mate shaft rotatably mounted in said casing and mounting thereon said pinion gear in such a manner as to rotate together therewith, said pinion mate shaft having a pair of cam portions adjacent the ends thereof;
   a pair of pressure rings retained within said casing for movememnt axially of said casing but against rotation relative to same and having grooves in which said cam portions of said pinion mate shaft are engaged so that rotation of said pinion mate shaft urges said pressure rings to move away from each other;
   a pair of friction clutches interposed between said pressure rings and said casing;
   means for selectively applying a preload to said friction clutches through control of said fluid pressure;
   a housing within which said casing is retained;
   a pair of roller bearings rotatably supporting said casing on said housing; and
   a pair of reaction plates, having annular body portions, mounted on said casing for movement axially of said casing but against rotation relative to same and each having a portion disposed outside of said casing and a portion projecting inside of same to engage corresponding one of said friction clutches, one of said reaction plates being rotatably supported on said housing and the other being operatively connected to said means to receive a fluid pressure therefrom.

* * * * *